US011407074B2

(12) United States Patent
Suzuki

(10) Patent No.: US 11,407,074 B2
(45) Date of Patent: Aug. 9, 2022

(54) PROCESSING MACHINE LINE

(71) Applicant: FUJI CORPORATION, Chiryu (JP)

(72) Inventor: Jun Suzuki, Kasugai (JP)

(73) Assignee: FUJI CORPORATION, Chiryu (JP)

( * ) Notice: Subject to any disclaimer, the term of this patent is extended or adjusted under 35 U.S.C. 154(b) by 568 days.

(21) Appl. No.: 16/330,885

(22) PCT Filed: Sep. 14, 2016

(86) PCT No.: PCT/JP2016/077063
§ 371 (c)(1),
(2) Date: Mar. 6, 2019

(87) PCT Pub. No.: WO2018/051423
PCT Pub. Date: Mar. 22, 2018

(65) Prior Publication Data
US 2021/0154787 A1   May 27, 2021

(51) Int. Cl.
*B23Q 11/08* (2006.01)
*B23Q 37/00* (2006.01)
(Continued)

(52) U.S. Cl.
CPC ............ *B23Q 11/0042* (2013.01); *B23Q 1/01* (2013.01); *B23Q 11/08* (2013.01); *B23Q 37/007* (2013.01)

(58) Field of Classification Search
CPC ............ B23Q 11/0067; B23Q 11/0042; B23Q 37/007; B23Q 11/08; B23Q 7/1405;
(Continued)

(56) References Cited

U.S. PATENT DOCUMENTS

| 1,617,606 A | * | 2/1927 | Pierle | ..................... B23Q 37/00 29/33 P |
| 3,943,808 A | * | 3/1976 | Pryor | ................... B23Q 1/0009 83/88 |

(Continued)

FOREIGN PATENT DOCUMENTS

| DE | 102016205234 B4 * | 2/2018 | ......... B23Q 11/0067 |
| EP | 3031529 A1 * | 6/2016 | ............... B04B 1/00 |

(Continued)

OTHER PUBLICATIONS

WO2016/063393 Machine Translation, pp. 1-10 (Year: 2022).*
International Search Report dated Nov. 1, 2016 in PCT/JP2016/077063 filed Sep. 14, 2016.

*Primary Examiner* — Nicole N Ramos
(74) *Attorney, Agent, or Firm* — Oblon, McClelland, Maier & Neustadt, L.L.P.

(57) ABSTRACT

A processing machine line including multiple processing modules arranged in a width direction and loaded on a base where a machine body is movable in a front-rear direction; an automatic workpiece transfer machine to perform transferring of a workpiece by moving a conveyance robot in front of the base; an external cover to cover the processing module; a front cover to form a conveyance space of the conveyance robot, the front cover being provided with, for each processing module, an upper section cover that is open-and-closable in a lifting up manner, and a lower section cover configuring a cover front surface with the upper section cover; and a chip receiving box to be removable and attachable by being attached between the lower section cover and the base via an installation bracket that is attachable and removable with respect to a top section of the lower section cover.

3 Claims, 7 Drawing Sheets

(51) Int. Cl.
*B23Q 11/00* (2006.01)
*B23Q 1/01* (2006.01)

(58) Field of Classification Search
CPC ........ B23Q 7/1421; B23Q 7/14; B23Q 7/041;
B23Q 7/046; B23Q 41/02; B25J 11/005;
B25J 11/0055; B25J 11/006
See application file for complete search history.

(56) References Cited

U.S. PATENT DOCUMENTS

| | | | | |
|---|---|---|---|---|
| 4,648,213 | A * | 3/1987 | Nagata | B23Q 11/0032 451/340 |
| 4,705,187 | A * | 11/1987 | Linn | B23Q 11/0021 220/819 |
| 5,531,004 | A * | 7/1996 | Ahn | B23Q 7/1431 29/33 P |
| 6,176,656 | B1 * | 1/2001 | Seong | B23Q 11/0891 409/134 |
| 7,387,478 | B2 * | 6/2008 | Anderson | B23Q 11/0042 29/DIG. 79 |
| 10,058,967 | B2 * | 8/2018 | Suzuyama | B23Q 1/0072 |
| 2002/0170689 | A1 * | 11/2002 | Yamagami | B23Q 11/08 160/368.1 |
| 2006/0104751 | A1 * | 5/2006 | Arai | B23Q 39/04 414/222.01 |
| 2007/0087665 | A1 * | 4/2007 | Curtis | B23Q 11/0891 451/7 |
| 2009/0010739 | A1 * | 1/2009 | Hinderer | B23Q 37/005 414/222.07 |
| 2016/0214225 | A1 * | 7/2016 | Mizuta | B23Q 11/0067 |
| 2016/0214226 | A1 * | 7/2016 | Nagato | B23Q 37/007 |
| 2016/0214227 | A1 * | 7/2016 | Nagato | B23C 1/06 |
| 2017/0225285 | A1 * | 8/2017 | Asakawa | B23Q 11/0067 |
| 2018/0215003 | A1 * | 8/2018 | Shoda | B23Q 3/06 |
| 2019/0030671 | A1 * | 1/2019 | Tooyama | B23Q 1/015 |
| 2019/0176283 | A1 * | 6/2019 | Asano | B23Q 11/0825 |
| 2020/0080366 | A1 * | 3/2020 | Vorpahl | E06B 9/11 |
| 2020/0262015 | A1 * | 8/2020 | Takada | B23Q 11/0825 |

FOREIGN PATENT DOCUMENTS

| | | | |
|---|---|---|---|
| JP | 9-225717 | 9/1997 | |
| WO | WO 2015/037149 A1 | 3/2015 | |
| WO | WO-2015037147 A1 * | 3/2015 | .......... B23Q 37/007 |
| WO | WO-2016063393 A1 * | 4/2016 | ............ B23Q 37/00 |

* cited by examiner

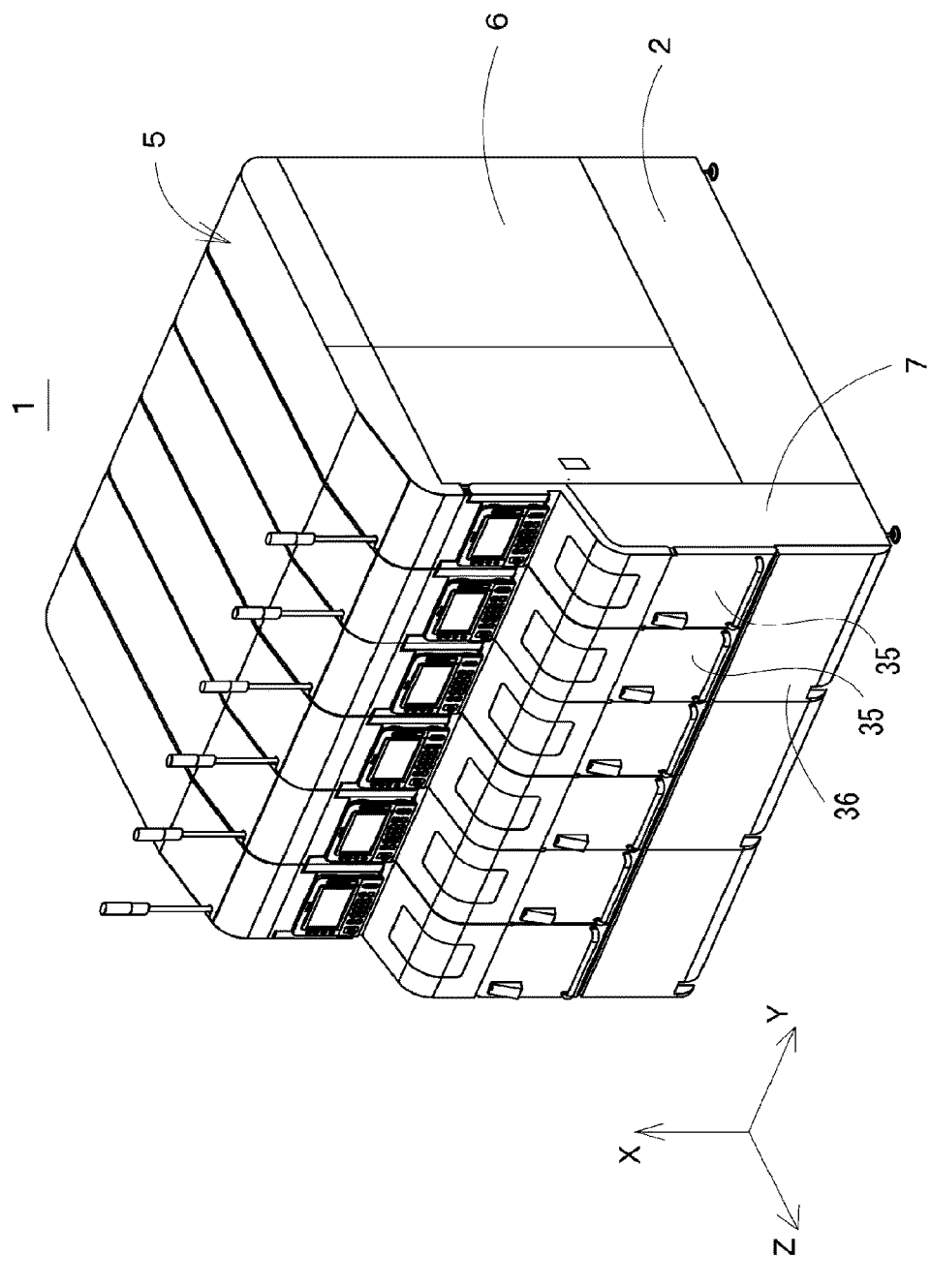
[FIG. 1]

[FIG. 2]
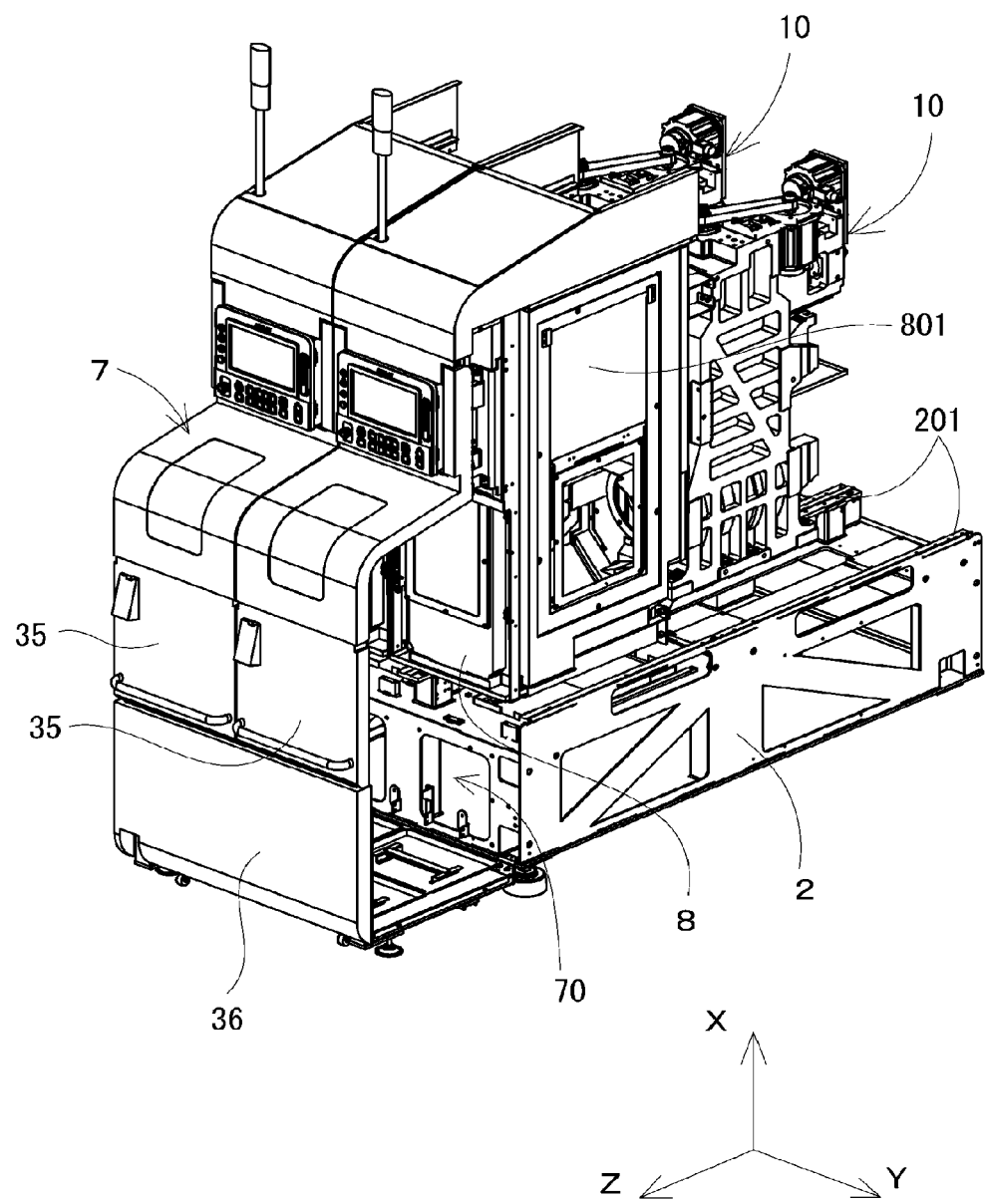

[FIG. 3]
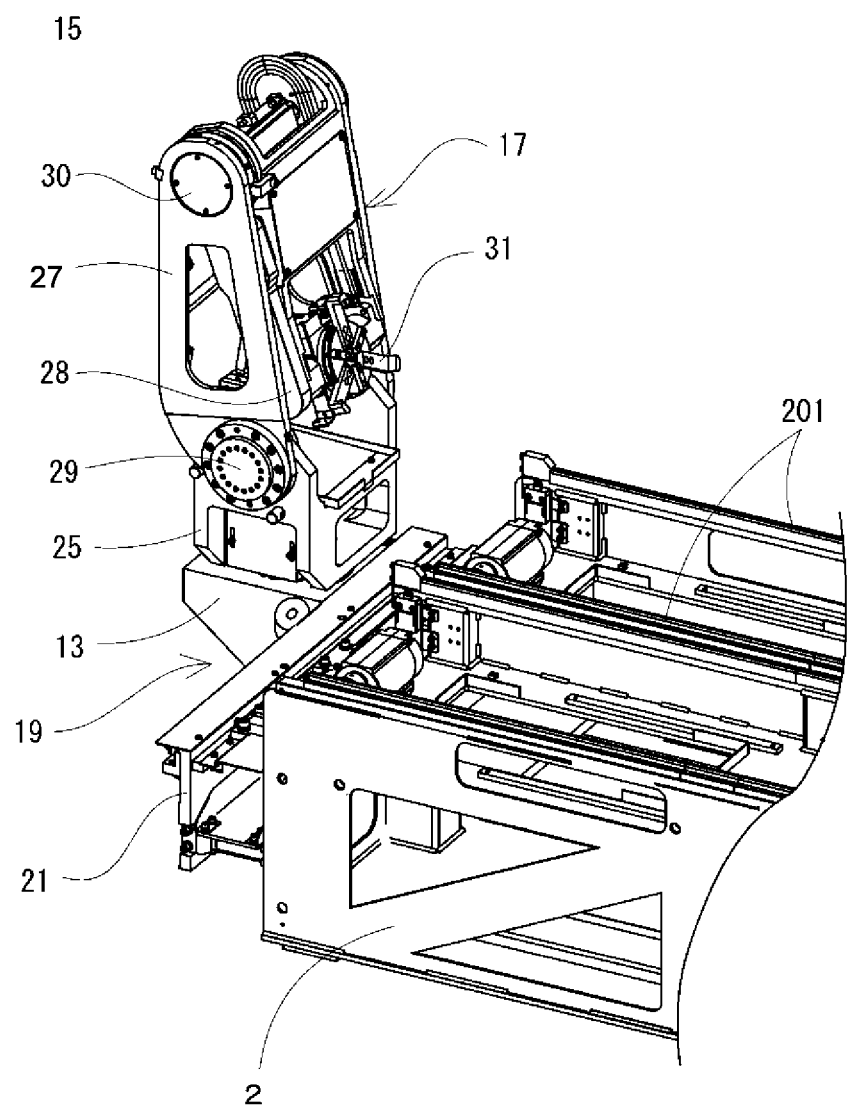

[FIG. 4]
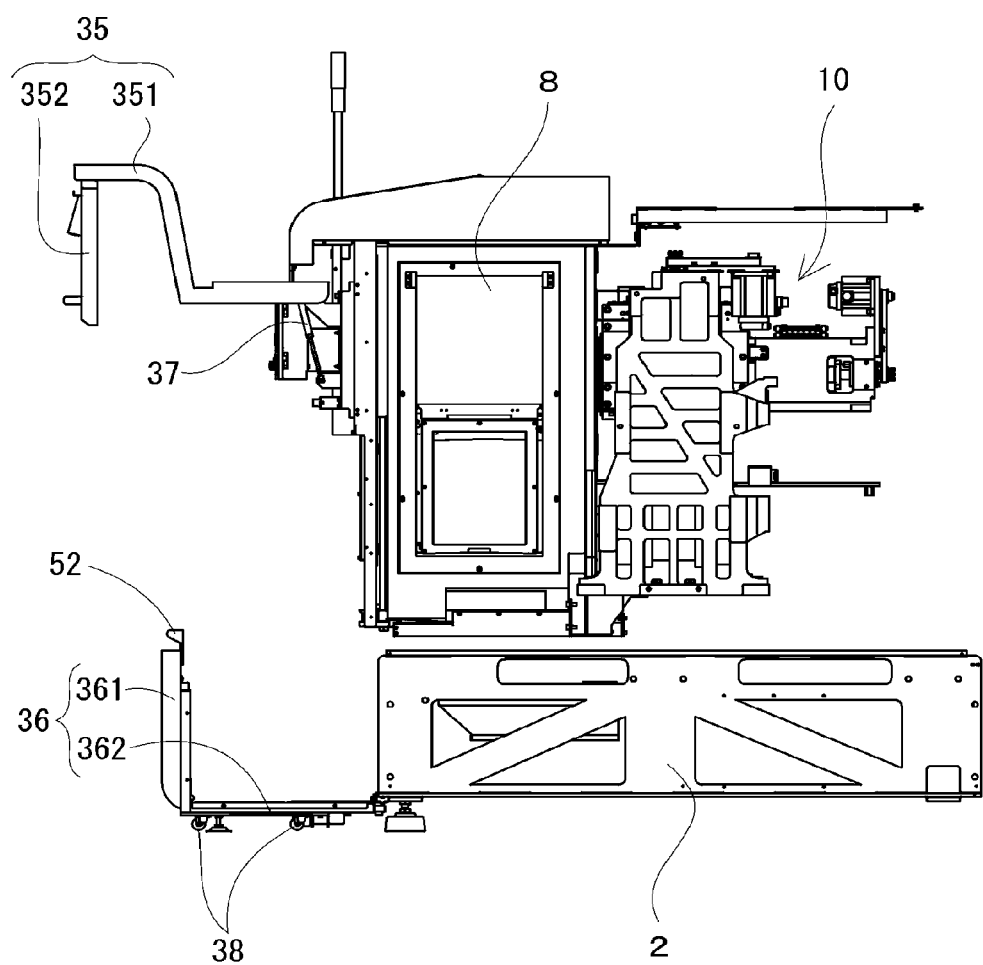

[FIG. 5]
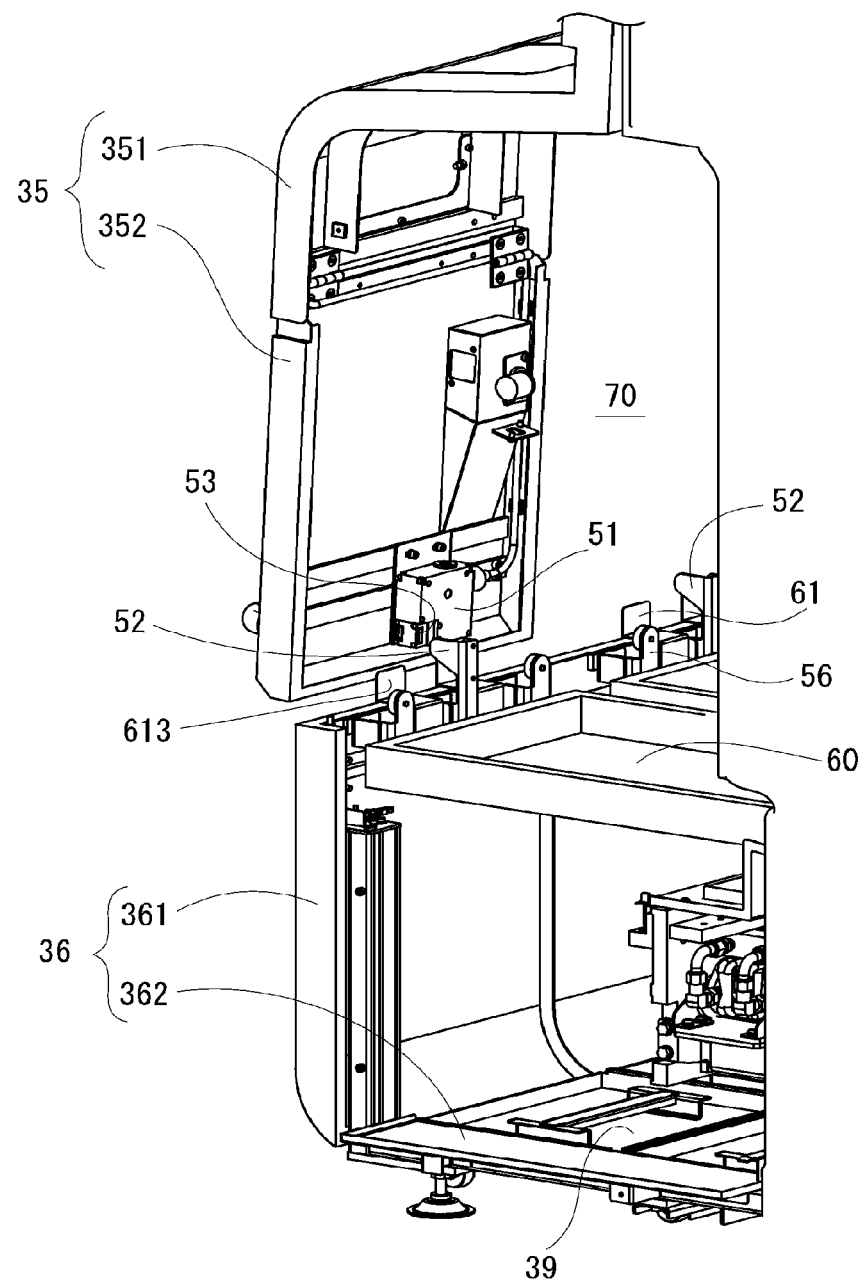

[FIG. 6]
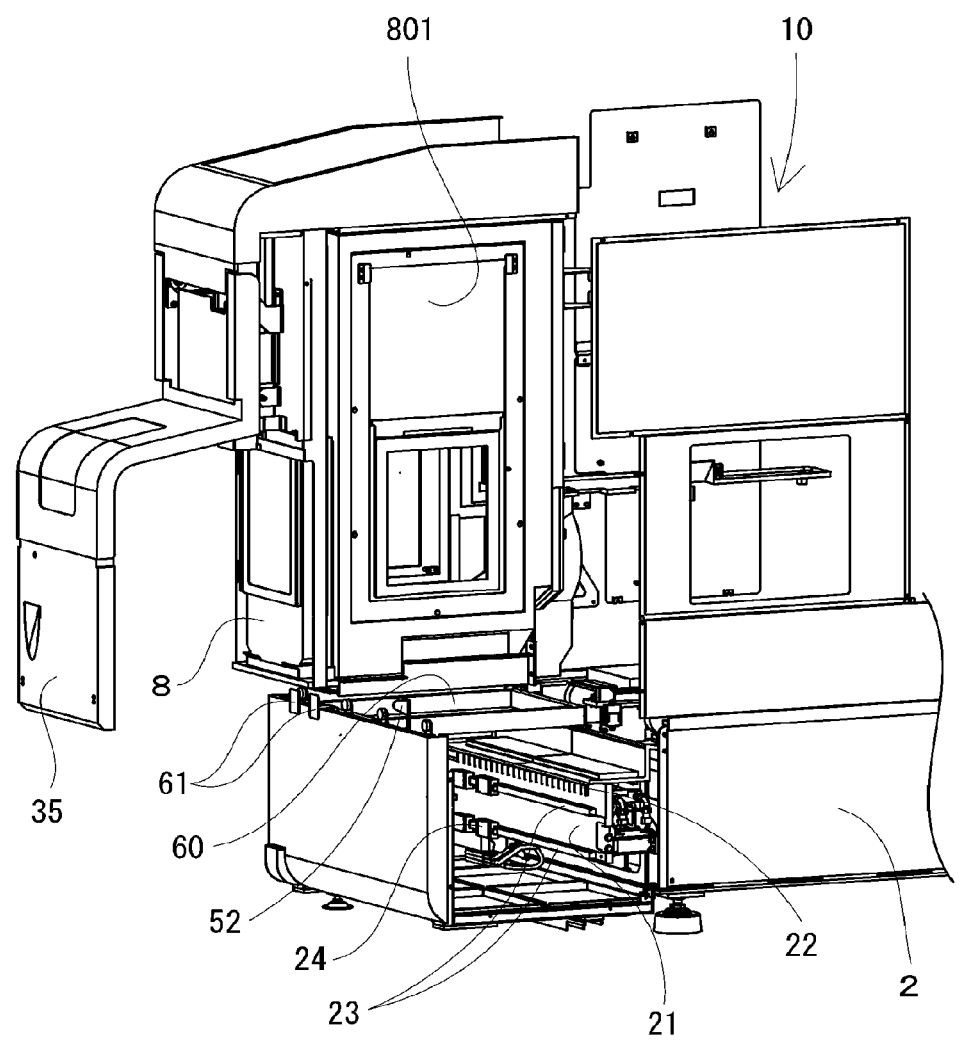

[FIG. 7]
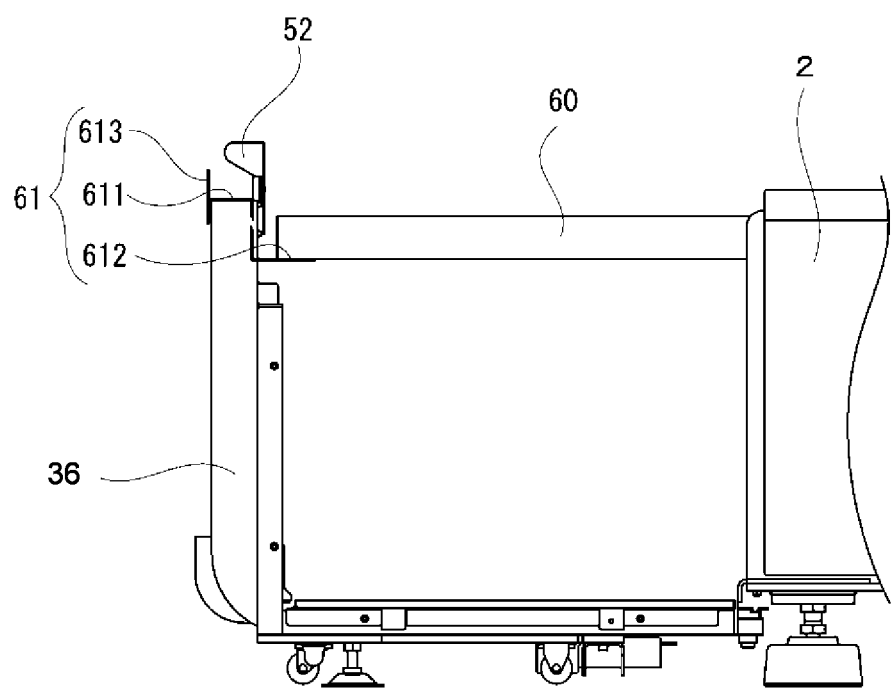

PROCESSING MACHINE LINE

TECHNICAL FIELD

The present application relates to a processing machine line provided with an automatic workpiece transfer machine that moves in front of multiple processing machines that are movable in a front-rear direction and transfers work between the multiple processing machines.

BACKGROUND ART

A processing machine line performs specified machining processing on a workpiece using multiple processing machines such as machine tools. An automatic workpiece transfer machine for conveying a workpiece to each of the processing machines is provided at the processing machine line. An automatic workpiece transfer machine includes a conveyance robot for transferring a workpiece between processing machines, and that conveyance robot is configured to be moved by a traveling device. For example, in patent literature 1, a processing machine line provided with an automatic workpiece transfer machine is disclosed. The processing machine line includes modularized processing machines such as machine tools that are loaded on a base and movable in a front-rear direction. That is, the processing module has a processing machine main body configured with wheels that engage on a moving bed, with the processing module being loaded on rails provided on the bed. The multiple processing modules are arranged adjacent to each other in a width direction, and an automatic workpiece transfer machine is provided on a front portion of the processing modules, with a conveyance robot that performs transfer of a workpiece moving in front of each processing module.

CITATION LIST

Patent Literature

Patent literature 1: WO2015-037149
Patent literature 2: JP-A-H09-225717

BRIEF SUMMARY

Technical Problem

With a processing machine line above, an operator performs work while standing in front of the line, for example, when a processing module is configured from a lathe, the operator performs cutting adjustments. To make work easy for the operator during the cutting adjustments, the processing module can be pulled forward towards the machine body front. In other words, the processing section of the processing module can be moved forward to a position where an automatic workpiece transfer machine is. Here, there is a worry that coolant or chips may fall from the processing section of the processing module and contaminate the automatic workpiece transfer machine portion. With respect to this point, with patent literature 1, a wound sheet is provided to extend in accordance with the movement of the processing module, and is configured to collect coolant and so on that drips down.

However, the configuration to extend the sheet is complicated due to being configured from many components, and the sheet may get damaged. Therefore, for example, as disclosed in patent literature 2, it is desirable to provide a configuration such that a chip receiving box can be temporarily arranged at an appropriate location of the automatic workpiece transfer machine. This is because the configuration is simple with just the chip receiving box being loaded, and handling is extremely easy. However, in this case, because an operator performs removal of the chip receiving box, it is necessary to take care not to forget to remove it. This is because the chip receiving box is arranged at a position where the conveyance robot moves.

Thus, to solve the above problems, an object of the present disclosure is to provide a processing machine line configured to ensure an operator does not forget to remove a chip receiving box.

Solution to Problem

A processing machine line of an embodiment of the present disclosure includes: multiple processing modules arranged in a width direction and loaded on a base in a state such that a machine body is movable in a front-rear direction; an automatic workpiece transfer machine configured to perform transferring of work by moving a conveyance robot in the width direction in which the processing modules are arranged in front of the base; an external cover configured to cover the processing module; a front cover configured to form a conveyance space of the conveyance robot, the front cover being provided with, for each processing module, an upper section cover that is open-and-closable in a lifting up manner, and a lower section cover configuring a cover front surface with the upper section cover; and a chip receiving box configured to be removable and attachable by being attached between the lower section cover and the base via an installation bracket that is attachable and removable with respect to a top section of the lower section cover, wherein the installation bracket is provided with a protruding section that protrudes from the top section of the lower section cover.

Advantageous Effects

According to the present disclosure, a chip receiving box is attached to an installation bracket that can be removed from and attached to a top section of a lower section cover so that the chip receiving box can be removed and from and attached between the lower section cover and a base, and because the installation bracket is provided with a protruding section that protrudes from the top section of the lower section cover, the top section cover cannot be closed properly, which informs an operator that they need to check whether the chip receiving box has forgotten to be removed, thereby ensuring that the operator does not forget to remove the chip receiving box.

BRIEF DESCRIPTION OF DRAWINGS

FIG. 1 is a perspective view of an embodiment of a processing machine line.
FIG. 2 is a perspective view of machine tool 5 that configures the processing machine line.
FIG. 3 is a perspective view of a conveyance robot of the automatic workpiece transfer machine.
FIG. 4 is a side view of a portion of a machine tool.
FIG. 5 is a perspective view of the conveyance space of the processing machine line from the rear side of the front cover.
FIG. 6 is a perspective view showing a processing module in a pulled forward state.

FIG. 7 is a side view showing a state with the chip receiving box set.

DESCRIPTION OF EMBODIMENTS

Next, an embodiment of a processing machine line according to the present disclosure will be described below with reference to the drawings. FIG. 1 is a perspective view of an embodiment of a processing machine line. Processing machine line 1 has six machine tools 5, such as lathes as examples of a processing machine, loaded on base 2 acting as a foundation. Each of the six machine tools 5 is the same type of NC lathe, with the same outer shape and dimensions. Also, an automatic workpiece transfer machine that performs transfer of a workpiece between the machine tools 5 is provided on processing machine line 1.

Here, "processing machine line" refers to a group of processing machines in which transfer of a workpiece between multiple processing machines such as machine tools is performed by an automatic workpiece transfer machine, and specified processing is performed on the workpiece by each of the processing machines. As shown in the figures, processing machine line 1 of the present embodiment has six machine tools 5 arranged adjacently in the width direction. Note that, in the present embodiment, the width direction in which the machine tools 5 are arranged is referred to as the Y-axis direction, the machine body front-rear direction is the Z-axis direction, and the vertical direction is the X-axis direction.

FIG. 2 is a perspective view of machine tool 5 (two loaded on base 2) that configures processing machine line 1. Machine tool 5 is configured from processing module 10 that is a modularized machine tool main body. Processing module 10 is covered overall by outer cover 6 shown in FIG. 1. Processing machine line 1 is configured from three bases 2 lined up in the width direction, with two processing modules 10 loaded on each base 2. Processing module 10 is configured to be loaded on movable bed provided with wheels, which is loaded on rails 201 provided on base 2 so as to be capable of traveling.

Therefore, processing module 10 can be pulled forward in the direction of the machine body front (refer to FIG. 6), thereby enabling maintenance or tool exchange or the like of each of the machine tools 5. Also, internal cover 8 is provided in processing module 10 so as to form a processing chamber that covers items such as the main axis chuck and the turret. Also, work door 801 is provided in internal cover 8, with work such as maintenance or component exchange being performed from an opened opening section of work door 801.

Processing machine line 1 has front cover 7 that is open-and-closable provided on a front section of outer cover 6 for each machine tool 5. Processing machine line 1 is configured with conveyance space 70 that passes in the Y-axis direction along front cover 7, with a work automatic conveyance machine assembled that performs transfer of a workpiece between each processing module 10 inside the conveyance space 70. FIG. 3 is a perspective view of a conveyance robot of the automatic workpiece transfer machine.

Conveyance robot 15 is configured with traveling device 19 assembled on base 2 and multi-jointed robot arm 17 loaded on traveling device 19. Traveling device 19 is fixed with plate-shape rail block 21 fixed to a front section of base 2 and rack 22 that is parallel to the Y-axis direction and two traveling rails 23 being fixed lined up in a vertical direction (refer to FIG. 6). Further, traveling base 25 is provided with traveling slider 24 (refer to FIG. 6) that slides along traveling rails 23. A traveling motor that applies rotation to a pinion that engages with rack 22 is loaded on traveling base 25. Accordingly, traveling base 25 can be moved in the Y-axis direction in front of base 2 by the driving of the traveling motor.

Multi-jointed robot arm 17 is loaded on traveling base 25 via rotating table 26. Multi-jointed robot arm 17 is configured with upper arm member 27 and front arm member 28 connected via joint mechanisms 29 and 30, and by the driving of joint mechanisms 29 and 30, it is possible to change the form to and from a folded state as shown in the figures and an extended state towards the processing module 10 side, which is not specifically shown. Further, robot hand 31 is provided on an end portion of front arm member 28 to be capable of gripping and releasing a workpiece.

FIG. 4 is a side view of processing module 10 that is a portion of machine tool 5, in particular showing a state with front cover 7 open. Front cover 7 is divided vertically, being configured from upper section cover 35 and lower section cover 36. As shown in FIG. 2, upper section cover 35 is formed corresponding to the width of one machine tool 5, and lower section cover 36 is formed corresponding to the width of base 2 (two machine tools 5). Upper section cover 35 is configured from two connected members, rotating cover 351 and hanging cover 352, and when in an open state, as shown in FIG. 4, upper section cover 35 is rotated to be opened upwards. Further, damper 37 is connected to upper section cover 35 such that when upper section cover 35 is opened, the movement upwards by the operator is aided and the open state is maintained.

Lower section cover 36 is configured to be removed from and attached to base 2, and by being provided with casters 38, can move along the floor. Lower section cover 36 is formed from front surface section 361 and bottom surface section 362, which are plate members formed in an L-shape. Front surface section 361 is formed with a vertical cover front surface that is substantially in the same plane as upper section cover 35, with receiving plate 39 (refer to FIG. 5) provided on bottom surface section 362, such that when conveyance robot 15 performs transfer of a workpiece between processing modules 10, chips and the like that drop down are collected.

Here, FIG. 5 is a perspective view of conveyance space 70 of processing machine line 1 from the rear side of front cover 7. Box 51 is provided inside upper section cover 35 at the lower end rear side of hanging cover 352, and an open-close detection sensor is also built-in. On the other hand, multiple receiving pads 56 for receiving hanging cover 352 that is in a closed state, and hook 52 for maintaining a closed state of upper section cover 35 are formed protruding upwards on lower section cover 36. Hook 52, when upper section cover 35 and lower section cover 36 are correctly closed as shown in FIG. 2, are inserted into engaging section 53 formed on box 51 to be detected by the open-close detection sensor inside box 51.

Further, drive control devices are loaded for each processing module 10, these devices storing processing programs for performing processing of each relevant process. Also, conveyance control devices for performing drive control of conveyance robot 15 are also provided on automatic workpiece transfer machine, these devices storing work conveyance programs for driving conveyance robot 15 in accordance with the processing performed by each processing module 10. When hook 52 is removed from engaging section 53, an opened signal is sent to the drive control device and conveyance control device from the open-close detection sensor inside box 51. That is, the configuration is such that an opened state of front cover 7 is detected. Further, in a case in which front cover 7 is detected to be in a closed state, processing module 10 and conveyance robot 15 are maintained in a drive stopped state by the drive control device and the conveyance control device.

Next, cutting adjustment such as checking the blade tip position of the cutting tool is performed at processing module 10, thus, as shown in FIG. 6, processing module 10 is pulled forwards, and a processing section configured from items such as a main axis chuck and turret is moved to position in conveyance space 70 that is forward of base 2. Here, for safety, an operator stops operation by turning off a driving power switch of machine tool 5 and the automatic workpiece transfer machine. However, if hook 52 is removed from engaging section 53 by upper section cover 35 being opened or the like, an opened signal is sent from the open-close detection sensor to each control device, so even if machine tool 5 or the automatic workpiece transfer machine were in an operational state, drive stopping is performed.

Here, FIG. 6 is a perspective view showing processing module 10 in a pulled forward state. During cutting adjustment, processing module 10 is pulled forwards as shown in FIG. 10, then, upper section cover 35 is opened as shown in FIG. 4, work door 801 of internal cover 8 is also opened, and adjustment is performed of the processing position of the cutting tool inside and so on. Here, as shown in FIGS. 5 and 6, to collect coolant and chips that fall from the processing section inside internal cover 8, chip receiving box 60 is attached as shown in FIGS. 5 and 6. Chip receiving box 60 of the present embodiment is a general-purpose plate-shaped container provided with a rectangular bottom surface section and a side surface section formed around a circumference of the bottom surface section, wherein an end (rear end) in the lengthwise direction is loaded on an end of base 2, and another end (front end) is, as shown in FIG. 7, loaded on installation bracket 61 attached to lower section cover 36. FIG. 7 is a side view showing a state with chip receiving box 60 set.

Installation bracket 61 is configured to be set so as normally not to interfere with conveyance robot 15 that moves inside conveyance space 70. Specifically, installation bracket 61 is configured from insertion section 611 formed in an inverse U-shape to straddle from the front surface to the rear surface of the upper section of lower section cover 36, supporting section 612 that is perpendicular to the rear end section of insertion section 611, and protruding section 613 that extends upwards from the front surface side of insertion section 611. Thus, installation bracket 61 can be attached simply by inserting insertion section 611 from above into the upper section of lower section cover 36. In this attachment state, support section 612 extends substantially horizontally to the rear side of lower section cover 36 and the front end of chip receiving box 60 is loaded on support section 612. Two installation brackets 61 are used for one chip receiving box 60 (refer to FIG. 5). However, the quantity of installation brackets 61 is not limited, for example, there may be three, or one may suffice if it is formed to be wider.

Installation bracket 61 includes protruding section 613 that extends upwards along the front surface of lower section cover 36. Protruding section 613, when upper section cover 35 that was open is closed, as shown in FIG. 5, contacts the lower end of hanging cover 352. When an operator has finished cutting adjustment at a processing module, the operator is supposed to return the processing module 10 onto base 2 by moving the processing module 10 rearwards, remove chip receiving box 60 and installation bracket 61, and close upper section cover 35.

However, if the operator forgets to remove chip receiving box 60, installation bracket 61 that supports the chip receiving box 60 also remains on lower section cover 36. Therefore, even if an operator closes upper section cover 35, the lower end of hanging cover 352 contacts protruding section 613 of installation bracket 61, and upper section cover 35 and lower section cover 36 cannot be closed properly, as shown in FIG. 2. In other words, hook 52 on the lower section cover 36 side is not inserted into engaging section 53 formed on box 51 of upper section cover 35, and the open-close detection sensor cannot detect a closed state. Accordingly, even if an operator turns on the drive power switch, machine tool 5 and automatic workpiece transfer machine 4 are maintained in a stopped control state.

Thus, in a case in which an operator first notices that upper section cover 35 is not closed, the operator can check whether chip receiving box 60 has forgotten to be removed. Here, by the operator re-opening upper section cover 35 and removing chip receiving box 60 and installation bracket 61, it is possible to correctly close upper section cover 35. Also, even if the operator does not notice that upper section cover 35 is not closed correctly, because a closed state is not detected by the open-close detection sensor, machine tool 5 and the automatic workpiece transfer machine do not operate. In this case, it is possible to make the operator notice that processing machine line 1 is in a stopped state, that upper section cover 35 is not closed correctly, and that chip receiving box 60 has forgotten to be removed. Therefore, by an operator removing chip receiving box 60 and installation bracket 61, hook 52 is inserted into insertion section 53, and processing module 10 and the automatic workpiece transfer machine are able to be driven.

Thus, according to the present disclosure, an operator is made to check whether chip receiving box 60 remains in conveyance space 70, thus preventing the operator from forgetting to remove chip receiving box 60. In other words, it is possible to prevent conveyance robot 17 that moves inside conveyance space 70 from colliding with chip receiving box 70. Further, installation bracket 61 for preventing such a collision is for attaching general-purpose item chip receiving box 60 at an attachment location in conveyance space 70, and these members used for cutting adjustment are extremely cheap. With respect to this point, the shape of installation bracket 61 includes protruding section 613 in accordance with the configuration of front cover 7, thus achieving the above effect with a cheap solution. Further, the stopped state of machine tool 5 and automatic workpiece transfer machine 4 has conventionally been controlled based on a signal of the open-close detection sensor that operates due to the insertion hook 52, but in the present embodiment, it is possible to reliably prevent an operator from forgetting to remove chip receiving box 60.

The above describes an embodiment of the present disclosure, but embodiments are not limited to these and various changes may be employed without departing from the scope of the disclosure. For example, the configuration may be such that it is detected when upper section cover 35 contacts protruding section 613 of installation bracket 61, and this fact may be actively reported to an operator. Also, the processing machine line may be configured not only from the same type of machine, but may also include different types of machine tools (lathes, drill presses, boring machines, milling machines, gear cutting machines, cutting machines, and so on).

REFERENCE SIGNS LIST

1: processing machine line; 5: machine tool; 6: outer cover; 7: front cover; 10: processing module; 15: conveyance robot; 17: multi jointed robot arm; 19: traveling device; 35: upper section cover; 36: lower section cover; 60: chip receiving box; 61: installation bracket; 70: conveyance space

The invention claimed is:

1. A processing machine line comprising:
multiple processing modules arranged in a width direction and loaded on a base in a state such that a machine body is movable in a front-rear direction;
a work automatic conveyance machine configured to perform transferring of a workpiece by moving a conveyance robot in the width direction in which the processing modules are arranged in front of the base;
an external cover configured to cover the processing module;
a front cover configured to form a conveyance space of the conveyance robot, the front cover being provided with, for each processing module, an upper section cover that is openable in a lifting up manner, and a lower section cover configuring a cover front surface with the upper section cover, the lower section cover including a front surface and a back surface, each extending from an upper-most section of the lower section cover towards the base, the front surface and the back surface connected by an upper-most surface extending along the upper-most section of the lower cover and along a plane substantially perpendicular to the front surface and the back surface;
an installation bracket that is attachable and removable to a top section of the lower section cover, the installation bracket including a protruding section that protrudes from the upper-most surface of the lower section cover; and
a chip receiving box configured to be removable and attachable to the installation bracket.

2. The processing machine line according to claim 1, wherein the installation bracket includes
an inverse U-shape section configured to extend upward along the front surface of the lower section cover, along the upper-most surface, and downward along the rear surface of the lower section cover; and
a support section configured to support the chip receiving box at the rear surface of the lower section cover, wherein
the protruding section extends upwards from the front surface of the lower section cover.

3. The processing machine line according to claim 2, wherein
the chip receiving box is a plate-shaped container provided with a rectangular bottom surface section and a side surface section formed around a perimeter of the rectangular bottom surface section, and
the installation bracket is formed such that a length of the support section that protrudes in a substantially horizontal direction to the rear from the rear surface of the lower section cover is formed in accordance with a dimension of the chip receiving box.

* * * * *